(12) United States Patent
Arakane et al.

(10) Patent No.: US 10,081,177 B2
(45) Date of Patent: Sep. 25, 2018

(54) INK-JET RECORDING APPARATUS

(71) Applicant: BROTHER KOGYO KABUSHIKI KAISHA, Nagoya-shi, Aichi-ken (JP)

(72) Inventors: Satoru Arakane, Nagoya (JP); Shoji Sato, Okazaki (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/696,970

(22) Filed: Sep. 6, 2017

(65) Prior Publication Data

US 2018/0072048 A1   Mar. 15, 2018

(30) Foreign Application Priority Data

Sep. 9, 2016 (JP) .................................. 2016-177073

(51) Int. Cl.
*B41J 2/045* (2006.01)
*G06K 15/10* (2006.01)
*H04N 1/40* (2006.01)
*H04B 3/00* (2006.01)

(52) U.S. Cl.
CPC ....... *B41J 2/04541* (2013.01); *B41J 2/04543* (2013.01); *B41J 2/04581* (2013.01); *G06K 15/102* (2013.01); *H04N 1/40025* (2013.01); *H04B 3/00* (2013.01); *H04N 2201/0094* (2013.01)

(58) Field of Classification Search
CPC .......................... B41J 2/04596; B41J 2/04533; B41J 2/04541; B41J 2/04573; B41J 2/04581; B41J 2/04555; B41J 2/04595; B41J 2/14225; B41J 2/14217; H04B 3/00; H04B 10/00; H04N 2201/0094; H04N 1/40025; H03M 9/00; G06K 15/102
See application file for complete search history.

(56) References Cited

U.S. PATENT DOCUMENTS 7,618,106 B2 * 11/2009 Usui .................... B41J 2/04541
347/9
2006/0197790 A1   9/2006 Ito et al.
2007/0080978 A1   4/2007 Yoshida

FOREIGN PATENT DOCUMENTS

JP    2006-239952 A   9/2006
JP    2007-105936 A   4/2007
JP    2011-251419 A   12/2011
JP    2015-89618 A    5/2015

* cited by examiner

*Primary Examiner* — Thinh H Nguyen
(74) *Attorney, Agent, or Firm* — Merchant & Gould P.C.

(57) ABSTRACT

An ink-jet recording apparatus includes: a recording head including nozzles and driving elements corresponding to the nozzles respectively; a controller; and a head driving circuit connected to the controller by a first signal line, a second signal line, and a third signal line through which a clock signal including edges is transmitted, the head driving circuit connected electrically to the driving elements. Each of the driving elements jets an ink from one of the nozzles corresponding thereto by an amount corresponding to driving voltage applied from the head driving circuit. The controller repeatedly executes output processing in which pattern signals indicating patterns of the driving voltage are continuously outputted to the first signal line while being synchronized with the clock signal and selection signals are continuously outputted to the second signal line while being synchronized with the clock signal.

10 Claims, 11 Drawing Sheets

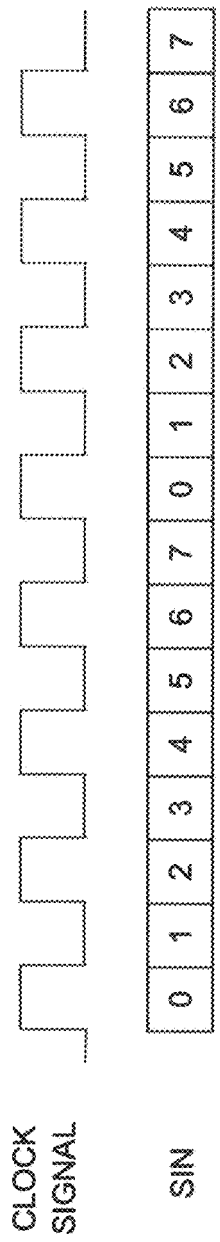
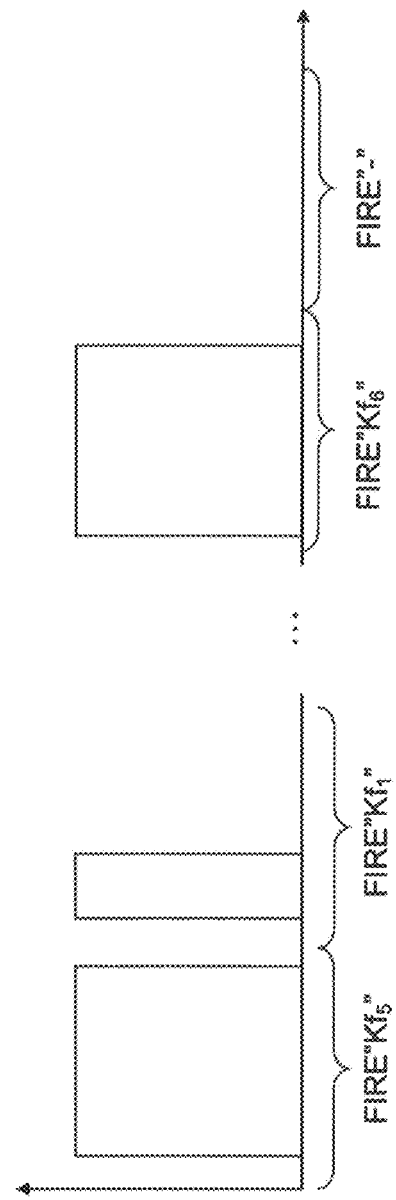

Fig. 7

| | SIN0 | SIN1 | SIN2 | SIN3 | SIN4 | SIN5 | SIN6 | SIN7 |
|---|---|---|---|---|---|---|---|---|
| A | Nozzle K1 | Nozzle K2 | LOW<br>LOW<br>LOW | LOW<br>LOW<br>LOW | LOW<br>LOW<br>LOW | LOW<br>LOW<br>LOW | LOW<br>LOW<br>LOW | LOW<br>LOW<br>LOW |
| B | Nozzle K3 | Nozzle K4 | Nozzle Y1 | Nozzle Y2 | LOW<br>LOW<br>LOW | LOW<br>LOW<br>LOW | LOW<br>LOW<br>LOW | LOW<br>LOW<br>LOW |
| C | Nozzle K5 | Nozzle K6 | Nozzle Y3 | Nozzle Y4 | Nozzle C1 | Nozzle C2 | LOW<br>LOW<br>LOW | LOW<br>LOW<br>LOW |
| D | LOW<br>LOW<br>LOW | Nozzle K7 | Nozzle Y5 | Nozzle Y6 | Nozzle C3 | Nozzle C4 | Nozzle M1 | Nozzle M2 |
| E | Nozzle K8 | Nozzle K9 | LOW<br>LOW<br>LOW | Nozzle Y7 | Nozzle C5 | Nozzle C6 | Nozzle M3 | Nozzle M4 |
| F | Nozzle K10 | Nozzle K11 | Nozzle Y8 | Nozzle Y9 | LOW<br>LOW<br>LOW | Nozzle C7 | Nozzle M5 | Nozzle M6 |
| G | LOW<br>RSV<br>RSV | Nozzle K12 | Nozzle Y10 | Nozzle Y11 | Nozzle C8 | Nozzle C9 | LOW<br>LOW<br>LOW | Nozzle M7 |
| H | RSV<br>HL<br>RSV | Nozzle K13 | LOW<br>RSV<br>RSV | Nozzle Y12 | Nozzle C10 | Nozzle C11 | Nozzle M8 | Nozzle M9 |
| I | RSV<br>LOW<br>LOW | Nozzle K14 | RSV<br>RSV<br>RSV | Nozzle Y13 | LOW<br>RSV<br>RSV | Nozzle C12 | Nozzle M10 | Nozzle M11 |
| J | LOW<br>LOW<br>HIGH | Nozzle K15 | RSV<br>LOW<br>LOW | Nozzle Y14 | RSV<br>RSV<br>RSV | Nozzle C13 | LOW<br>RSV<br>RSV | Nozzle M12 |
| K | HIGH<br>HIGH<br>HIGH | Nozzle K16 | LOW<br>LOW<br>HIGH | Nozzle Y15 | RSV<br>LOW<br>LOW | Nozzle C14 | RSV<br>RSV<br>RSV | Nozzle M13 |
| L | HIGH<br>HIGH<br>HIGH | Nozzle K17 | HIGH<br>HIGH<br>HIGH | Nozzle Y16 | LOW<br>LOW<br>HIGH | Nozzle C15 | RSV<br>LOW<br>LOW | Nozzle M14 |
| M | HIGH<br>HIGH<br>HIGH | Nozzle K18 | HIGH<br>HIGH<br>HIGH | Nozzle Y17 | HIGH<br>HIGH<br>HIGH | Nozzle C16 | LOW<br>LOW<br>HIGH | Nozzle M15 |
| N | HIGH<br>HIGH<br>HIGH | Nozzle K19 | HIGH<br>HIGH<br>HIGH | Nozzle Y18 | HIGH<br>HIGH<br>HIGH | Nozzle C17 | HIGH<br>HIGH<br>HIGH | Nozzle M16 |
| O | | | HIGH<br>HIGH<br>HIGH | Nozzle Y19 | HIGH<br>HIGH<br>HIGH | Nozzle C18 | HIGH<br>HIGH<br>HIGH | Nozzle M17 |
| P | | | | | HIGH<br>HIGH<br>HIGH | Nozzle C19 | HIGH<br>HIGH<br>HIGH | Nozzle M18 |
| Q | | | | | | | HIGH<br>HIGH<br>HIGH | Nozzle M19 |

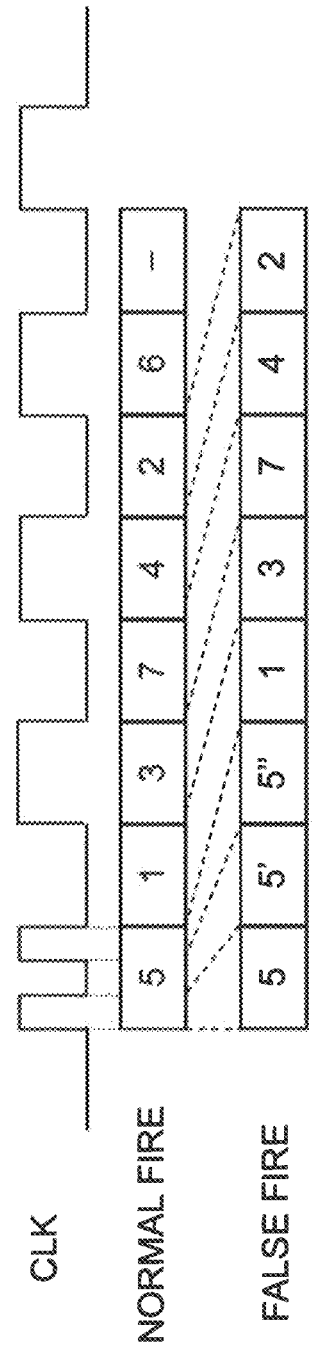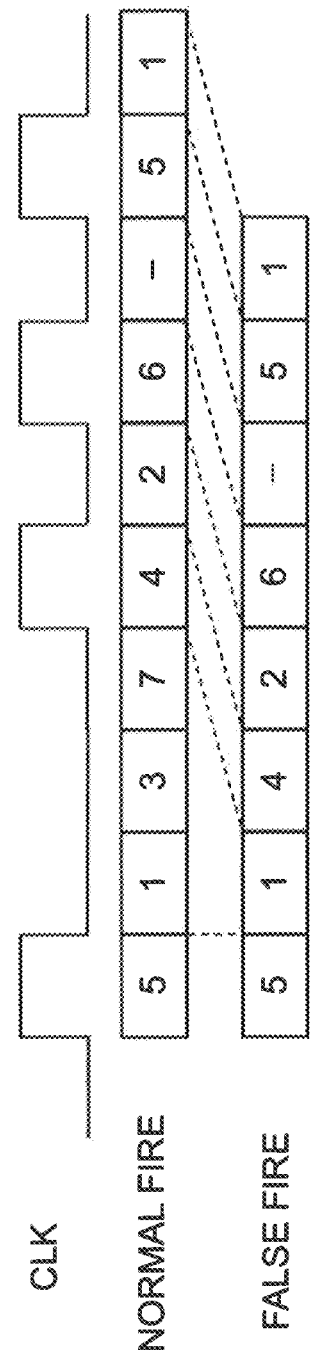

Fig. 9

| FIRE | 1 | 2 | 3 | 4 | 5 | 6 | 7 |
|---|---|---|---|---|---|---|---|
| INK JETTING AMOUNT | S | M | L | LL | long | long | NON-JETTING |

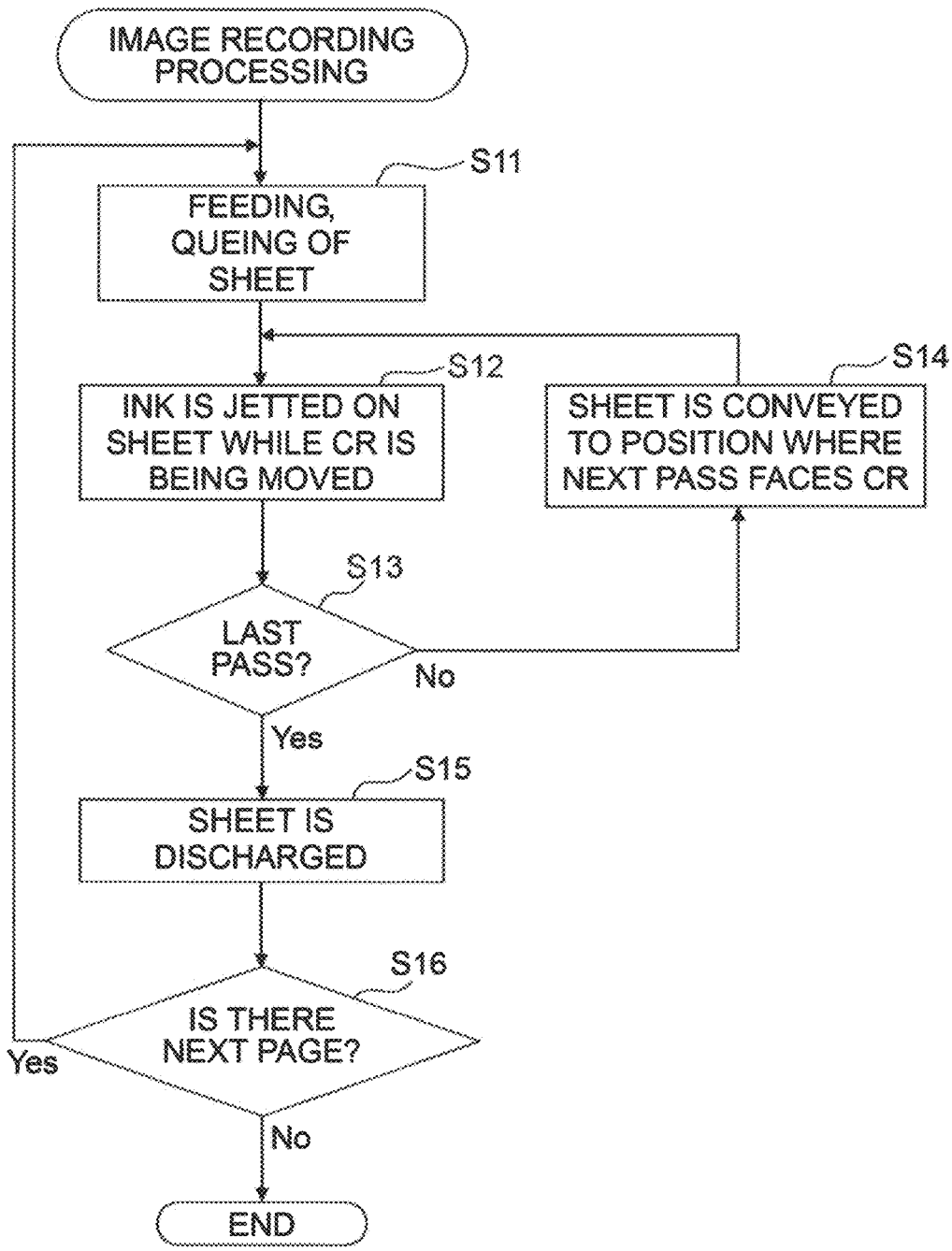

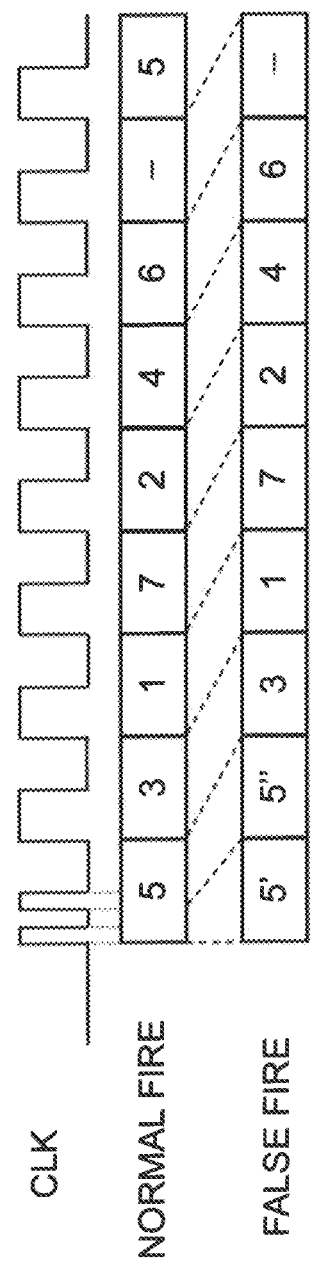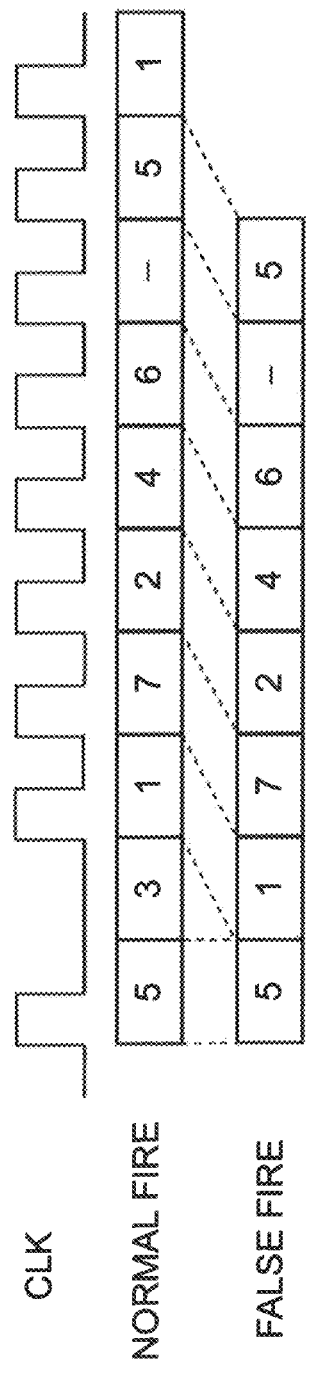

INK-JET RECORDING APPARATUS

CROSS REFERENCE TO RELATED APPLICATION

The present application claims priority from Japanese Patent Application No. 2016-177073 filed on Sep. 9, 2016, the disclosure of which is incorporated herein by reference in its entirety.

BACKGROUND

Field of the Invention

The present invention relates to an ink-jet recording apparatus that records an image on a sheet by jetting ink.

Description of the Related Art

There is known an ink-jet recording apparatus including a controller that controls the whole apparatus and a recording head that mounts a head control circuit and nozzles (e.g., Japanese Patent Application Laid-open No. 2011-251419). The head control circuit causes ink to be jetted from each nozzle in response to an instruction from the controller, thereby recording an image on a sheet.

More specifically, the controller serially outputs a FIRE signal indicating patterns of driving voltage to be applied to each driving element, a SIN signal selecting one of the patterns included in the FIRE signal, and a CLK signal for synchronizing the FIRE signal and the SIN signal, to the head control circuit through different signal lines. The head control circuit converts the FIRE signal and the SIN signal in parallel in response to the CLK signal, and the driving voltage of the pattern selected by the converted SIN signal is applied in parallel to driving elements.

SUMMARY

The FIRE signal described in Japanese Patent Application Laid-open No. 2011-251419 includes patterns by which ink jetting amounts are different from each other and a non-jetting driving pattern that vibrates each driving element to an extent that no ink is jetted, as depicted, for example, in FIG. 6B. When noise is superimposed, for example, on the clock signal in the ink-jet recording apparatus constructed as described above, the head control circuit may not properly recognize a boundary between the FIRE signal and the SIN signal transmitted serially. In that case, the pattern causing the ink to be jetted might be selected even when the non-jetting driving pattern is to be selected. This wastes a large amount of ink and causes the ink to contaminate the ink-jet recording apparatus.

The present teaching has been made in view of the above circumstances, and an object of the present teaching is to provide an ink-jet recording apparatus that reduces an ink amount which may otherwise be jetted erroneously due to superimposition of noise on a clock signal.

According to a first aspect of the present teaching, there is provided an ink-jet recording apparatus, including:
a recording head including nozzles and driving elements corresponding to the nozzles respectively;
a controller; and
a head driving circuit connected to the controller by a first signal line, a second signal line, and a third signal line through which a clock signal including edges is transmitted, the head driving circuit connected electrically to the driving elements,
wherein each of the driving elements is configured to be driven to jet ink from one of the nozzles corresponding thereto by an amount corresponding to driving voltage applied from the head driving circuit,
the controller is configured to repeatedly execute output processing, in which pattern signals indicating patterns of the driving voltage are continuously outputted to the first signal line while being synchronized with the clock signal, and in which selection signals are continuously outputted to the second signal line while being synchronized with the clock signal,
each of the selection signals is used to select, from among the pattern signals, the driving voltage to be applied to the driving element corresponding thereto,
the head driving circuit is configured to repeatedly execute first extraction processing, second extraction processing, and voltage application processing,
the first extraction processing being processing in which the pattern signals inputted through the first signal line are extracted based on the respective edges of the clock signal,
the second extraction processing being processing in which the selection signals inputted through the second signal line are extracted based on the respective edges of the clock signal,
the voltage application processing being processing in which the driving voltage selected based on the selection signals is applied in parallel to the driving elements corresponding thereto,
the pattern signals include:
a non-jetting driving pattern signal indicating a pattern of the driving voltage by which no ink is jetted;
a first pattern signal indicating a pattern of the driving voltage by which ink having a first amount is jetted; and
a second pattern signal indicating a pattern of the driving voltage by which ink having a second amount larger than the first amount is jetted, and
in the output processing, the controller is configured to output the pattern signals to the first signal line in an order in which the first pattern signal and the non-jetting driving pattern signal are adjacent to the second pattern signal.

When the signals are extracted based on both of the rising edge and the falling edge of the clock signal as in the above construction, noise may increase or decrease the cycle or period of the clock signal by one. In that case, the head driving circuit erroneously recognizes a pattern signal arranged before or after the non-jetting driving pattern signal by two therefrom, as the non-jetting driving pattern signal. Thus, the ink amount jetted by the pattern signal arranged before or after the non-jetting driving pattern signal by two therefrom, is made to be smaller than the ink amount jetted by the pattern signal adjacent to the non-jetting driving pattern signal. Accordingly, it is possible to reduce the ink amount which may otherwise be jetted erroneously due to the superimposition of noise on the clock signal.

According to a second aspect of the present teaching, there is provided an ink-jet recording apparatus, including:
a recording head including nozzles and driving elements corresponding to the nozzles respectively,
a controller, and
a head driving circuit connected to the controller by a first signal line, a second signal line, and a third signal line through which a clock signal including edges is transmitted, the head driving circuit connected electrically to the driving elements, wherein each of the driving elements is configured to be driven to jet ink from one of the nozzles corresponding thereto by an amount corresponding to driving voltage applied from the head driving circuit, the controller is configured to repeatedly execute output processing, in which pattern signals indicating patterns of the driving voltage are continuously outputted to the first signal line while being synchronized with the clock signal, and in which selection signals are continuously outputted to the second signal line while being synchronized with the clock signal, each of the selection signals is used to select, from among the pattern signals, the driving voltage to be applied to the driving element corresponding thereto, the head driving circuit is configured to repeatedly execute first extraction processing, second extraction processing, and voltage application processing, the first extraction processing being processing in which the pattern signals inputted through the first signal line are extracted based on the respective edges of the clock signal, the second extraction processing being processing in which the selection signals inputted through the second signal line are extracted based on the respective edges of the clock signal, the voltage application processing being processing in which the driving voltage selected based on the selection signals is applied in parallel to the driving elements corresponding thereto, the pattern signals include:

a non-jetting driving pattern signal indicating a pattern of the driving voltage by which no ink is jetted;

a first pattern signal indicating a pattern of the driving voltage by which ink having a first amount is jetted; and a second pattern signal indicating a pattern of the driving voltage by which ink having a second amount larger than the first amount is jetted, the edges of the clock signal include a rising edge and a falling edge, and in the output processing, the controller is configured to synchronize the non-jetting driving pattern signal and the first pattern signal with one of the rising edge and the falling edge of the clock signal and to synchronize the second pattern signal with the other of the rising edge and the falling edge of the clock signal.

When the signals are extracted based on both of the rising edge and the falling edge of the clock signal, the head driving circuit does not erroneously recognize the pattern signal extracted based on the rising edge and the pattern signal extracted based on the falling edge. Thus, like the above configuration, the non-jetting driving pattern signal is synchronized with one of the rising edge and the falling edge, and the second pattern signal is synchronized with the other of the rising edge and the falling edge. Accordingly, it is possible to reduce the ink amount which may otherwise be jetted erroneously.

According to a third aspect of the present teaching, there is provided an ink-jet recording apparatus, including:

a recording head including nozzles and driving elements corresponding to the nozzles respectively, a controller, and a head driving circuit connected to the controller by a first signal line, a second signal line, and a third signal line through which a clock signal is transmitted, and the head driving circuit connected electrically to the driving elements, wherein each of the driving elements is configured to be driven to jet ink from one of the nozzles corresponding thereto by an amount corresponding to driving voltage applied from the head driving circuit, the controller is configured to repeatedly execute output processing, in which pattern signals indicating patterns of the driving voltage are continuously outputted to the first signal line while being synchronized with the clock signal, and in which selection signals are continuously outputted to the second signal line while being synchronized with the clock signal, each of the selection signals is used to select, from among the pattern signals, the driving voltage to be applied to the driving element corresponding thereto, the clock signal includes rising edges and falling edges, the rising edges or the falling edges are switching edges, the head driving circuit is configured to repeatedly execute first extraction processing, second extraction processing, and voltage application processing, the first extraction processing being processing in which the pattern signals inputted through the first signal line are extracted based on the respective switching edges of the clock signal, the second extraction processing being processing in which the selection signals inputted through the second signal line are extracted based on the respective switching edges of the clock signal, the voltage application processing being processing in which the driving voltage selected based on the selection signals is applied in parallel to the driving elements corresponding thereto, the pattern signals include:

a non-jetting driving pattern signal indicating a pattern of the driving voltage by which no ink is jetted;

a first pattern signal indicating a pattern of the driving voltage by which ink having a first amount is jetted; and a second pattern signal indicating a pattern of the driving voltage by which ink having a second amount larger than the first amount is jetted, and in the output processing, the controller is configured to output the pattern signals to the first signal line in an order in which the second pattern signal and the non-jetting driving pattern signal are adjacent to the first pattern signal.

When the signals are extracted based on one of the rising edge and the falling edge of the clock signal, noise may increase or decrease the cycle or period of the clock signal by one. In that case, the head driving circuit erroneously recognizes a pattern signal arranged directly before or directly after the non-jetting driving pattern signal, as the non-jetting driving pattern signal. Thus, the ink amount jetted by the pattern signal adjacent to the non-jetting driving pattern signal is made to be smaller than the ink amount jetted by the pattern signal that is not adjacent to the non-jetting driving pattern signal. Accordingly, it is possible to reduce the ink amount which may otherwise be jetted erroneously due to the superimposition of noise on the clock signal.

BRIEF DESCRIPTION OF THE DRAWINGS

FIG. 6A schematically depicts a jetting instruction signal SIN, pattern signals FIRE0 and FIRE1, and a clock signal CLK, and FIG. 6B depicts examples of the pattern signals.

FIG. 7 schematically depicts selection signals SIN0 to SIN7.

FIGS. 8A and 8B each schematically depict an exemplary pattern signal FIRE generated when noise is superimposed on the clock signal CLK.

FIG. 9 depicts relations between the pattern signals FIRE and ink jetting amounts from the nozzle.

FIG. 10 is a flow chart indicating image recording processing.

FIGS. 11A and 11B each schematically depict an exemplary pattern signal FIRE generated when noise is superimposed on the clock signal CLK.

DESCRIPTION OF THE EMBODIMENTS

Figure 1:
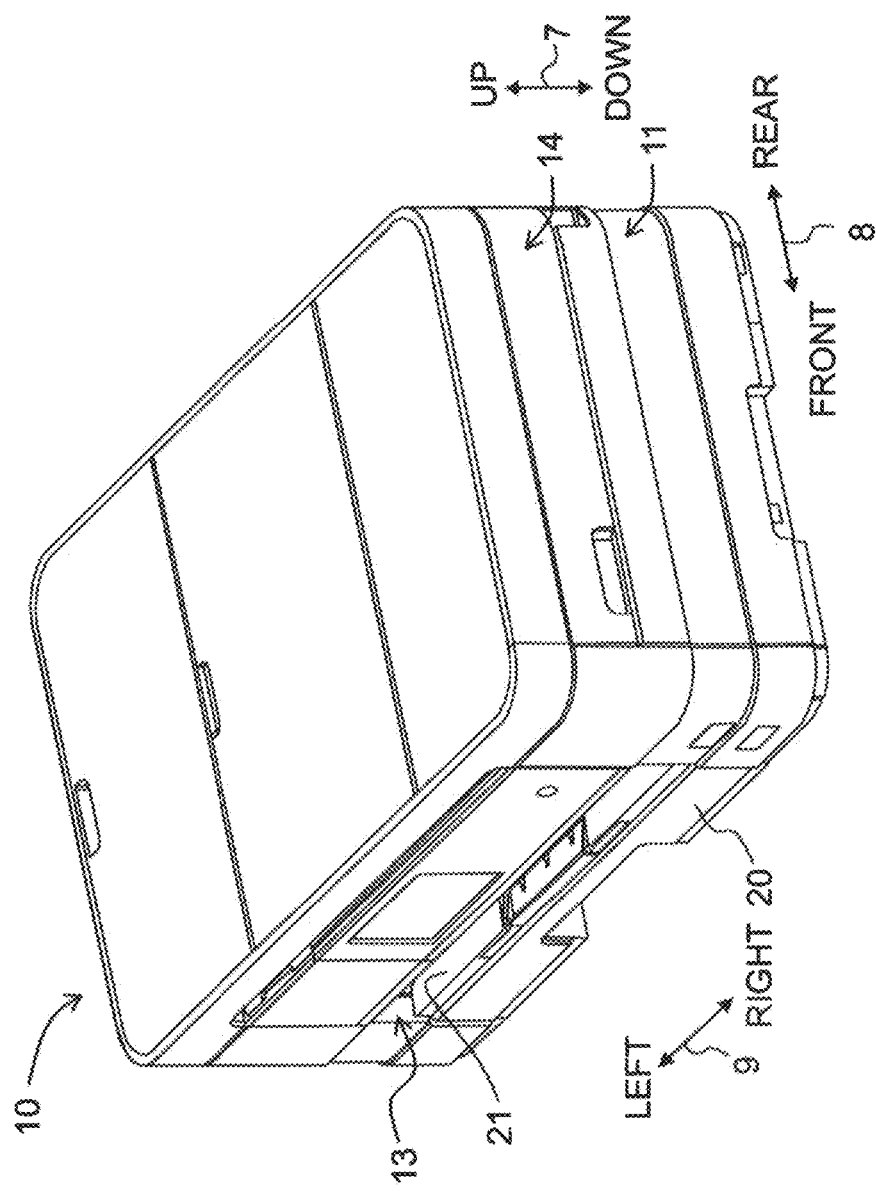
FIG. 1 is a perspective view of an external appearance of a multifunction peripheral.

An embodiment of the present teaching will be described below. Note that, the embodiment described below is merely an example of the present teaching; it goes without saying that it is possible to make any appropriate change(s) in the embodiment of the present teaching without departing from the gist and/or scope of the present teaching. In the following explanation, an up-down direction 7 is defined on the basis of the state in which a multifunction peripheral 10 is placed to be usable (the state depicted in FIG. 1). A front-rear direction 8 is defined as an opening 13 of the multifunction peripheral 10 is provided on the near side (the front side). A left-right direction 9 is defined as the multi-function peripheral 10 is seen from the near side (the front side).

<Overall Configuration of Multifunction Peripheral 10>

As depicted in FIG. 1, the multifunction peripheral 10 (an exemplary ink-jet recording apparatus) has a substantially rectangular parallelepiped shape. The multifunction peripheral 10 includes, at a lower portion of the multifunction peripheral 10, a printer unit 11 that records an image onto a sheet 12 (see FIG. 2) or the like. The multifunction peripheral 10 includes, at an upper portion of the multifunction peripheral 10, a scanner unit 14 that reads an image of a document. The multifunction peripheral 10 has a scanning function, a facsimile function, and the like, in addition to a print function. In the present description, detailed explanations for a configuration of the scanner unit 14, the scan function, and the facsimile function will be omitted.

<Feed Tray 20 and Discharge Tray 21>

Figure 2:
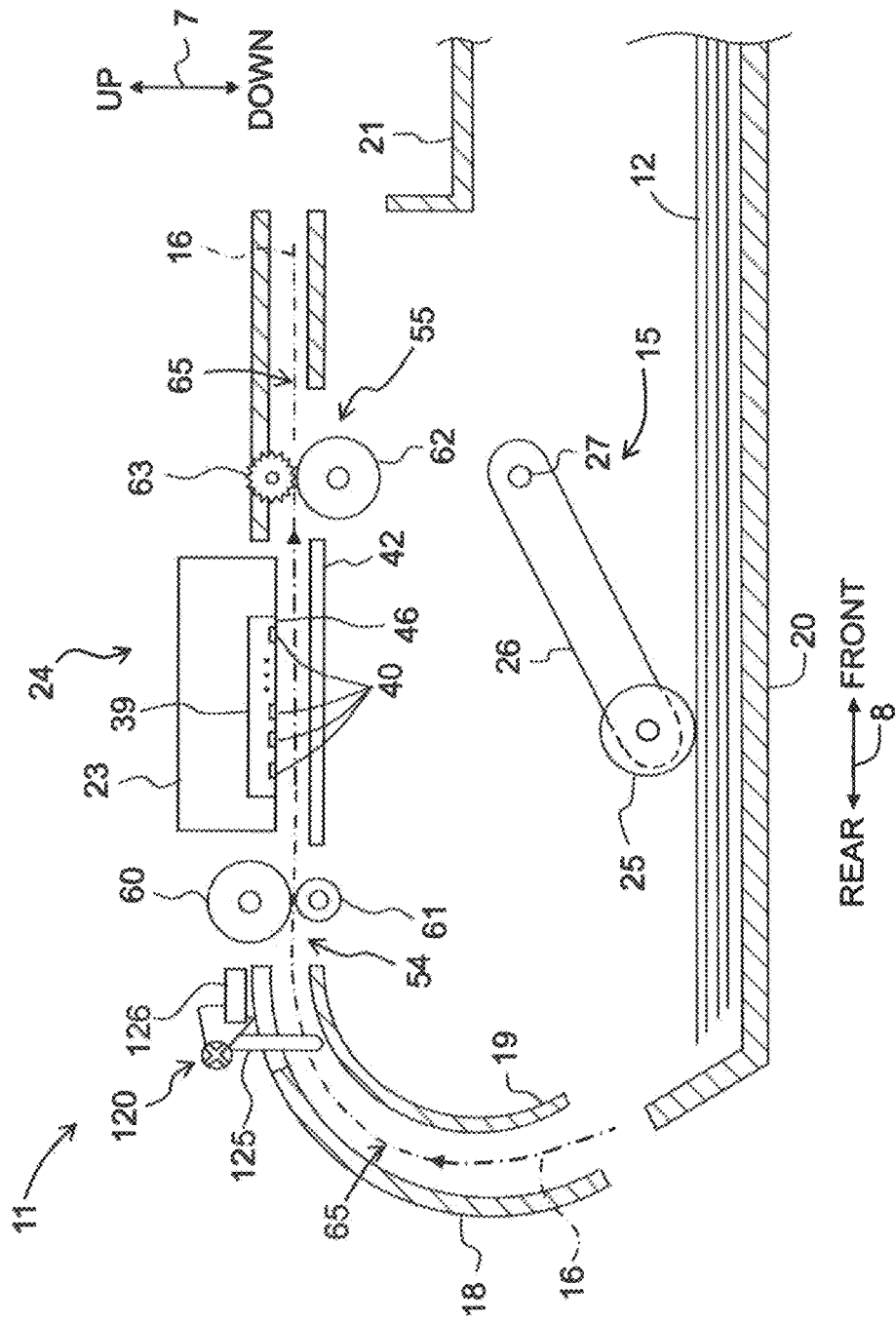
FIG. 2 is a vertical cross-sectional view schematically depicting an internal structure of a printer unit.

As depicted in FIG. 1, a feed tray 20 is disposed at a lowermost portion of the printer unit 11. The feed tray 20 may be inserted into or removed from a casing of the multifunction peripheral 10 in the front-rear direction 8 through the opening 13 formed in a front surface of the printer unit 11. As depicted in FIG. 2, the feed tray 20 supports sheets 12 stacked therein. A discharge tray 21 is arranged immediately above the feed tray 20. The discharge tray 21 supports the sheet 12 discharged from a conveyance route 65.

<Feed Unit 15>

As depicted in FIG. 2, a feed unit 15 is provided above the feed tray 20 installed to the printer unit 11. The feed unit 15 includes a feed roller 25, a feed arm 26, and a shaft 27. The feed roller 25 is provided to be rotatable on the front-end side of the feed arm 26. The feed roller 25 rotates when driving force is applied thereto from a feed motor 101 (see FIG. 4). The feed arm 26 is pivotably supported by the shaft 27 supported by a frame of the printer unit 11. The feed arm 26 is urged toward the feed tray 20 by elastic force of a spring or the like, or by the self-weight of the feed arm 26. The feed roller 25 rotates in contact with the uppermost sheet 12 supported by the feed tray 20, thus feeding the uppermost sheet 12 to the conveyance route 65.

<Conveyance Route 65>

As depicted in FIG. 2, the conveyance route 65 is a route or path which extends from a rear-end portion of the feed tray 20 toward the rear side of the printer unit 11, makes a U-turn frontwardly while extending from the lower side to the upper side at the rear side of the printer unit 11, and reaches the discharge tray 21 via the recording unit 24. A part of the conveyance route 65 is a space defined in the interior of the printer unit 11 by use of an outer guide member 18 and an inner guide member 19 arranged to face each other with a predetermined interval (gap) intervened therebetween. The conveyance route 65 passes a pinching position by use of a conveyance roller unit 54, a position between the platen 42 and the recording head 39, and a pinching position by use of a discharge roller unit 55 to reach the discharge tray 21. In FIG. 2, a conveyance direction 16 of the sheet 12 in the conveyance route 65 is indicated by an arrow of a dot-dash chain line. In the conveyance route 65, a resist sensor 120 extending from the outer guide member 18 to the conveyance route 65 is provided upstream of the conveyance roller unit 54 in the conveyance direction 16. The resist sensor 120 includes a detecting element 125 and an optical sensor 126. The detecting element 125 is rotatable to advance to or retract from the conveyance route 65. The optical sensor 126 is configured to detect a rotating posture of the detecting element 125. When the sheet 12 conveyed through the conveyance route 65 makes contact with the detecting element 125 of the resist sensor 120, the detecting element 125 protruding into the conveyance route 65 rotates to retract from the conveyance route 65.

<Conveyance Roller Unit 54 and Discharge Roller Unit 55>

As depicted in FIG. 2, the conveyance roller unit 54 (an exemplary conveyor) is arranged in the conveyance route 65 at a position downstream of the feed unit 15 and upstream of the recording unit 24, in the conveyance direction 16. The conveyance roller unit 54 includes a conveyance roller 60 and a pinch roller 61. The conveyance roller 60 is driven by a conveyance motor 102. The pinch roller 61 rotates following the rotation of the conveyance roller 60. The sheet 12 is conveyed in the conveyance direction 16 in a state of being pinched between the conveyance roller 60 and the pinch roller 61.

The conveyance roller 60 is provided with a rotary encoder 121. The rotary encoder 121 includes a disk-shaped encoder disk and an optical sensor. The encoder disk and the conveyance roller 60 are fixed coaxially to the same shaft, and the encoder disk 122 rotates together with the conveyance roller 60. In the encoder disk, transmissive parts and non-transmissive parts extending radially are arranged alternately in a circumferential direction at regular pitches. The optical sensor detects a pattern of the encoder disk rotating together with the conveyance roller 60 and outputs a pulse signal to the controller 130. The controller 130 calculates the rotating direction and speed of the conveyance roller 60 based on the pulse signal to control the rotating amount of the conveyance roller 60, and the like.

The discharge roller unit 55 (an exemplary conveyor) is arranged in the conveyance route 65 at the downstream side of the recording unit 24 in the conveyance direction 16. The discharge roller section 55 includes a discharge roller 62 and a spur 63. The discharge roller 62 is driven by the conveyance motor 102. The spur 63 rotates following the rotation of the discharge roller 62. The sheet 12 is conveyed in the conveyance direction 16 in a state of being pinched between the discharge roller 62 and the spur 63. The discharge roller 62 rotates in synchronization with the conveyance roller 60.

<Platen 42>

As depicted in FIG. 2, the platen 42 is arranged at a position below the conveyance route 65 and between the conveyance roller unit 54 and the discharge roller unit 55 in the conveyance direction 16. The platen 42 is arranged to face the recording unit 24 and supports the sheet 12 conveyed through the conveyance route 65, from therebelow.

<Recording Unit 24>

As depicted in FIG. 2, the recording unit 24 is arranged at a position above the conveyance route 65 and between the conveyance roller unit 54 and the discharge roller unit 55 in the conveyance direction 16. The recording unit 24 is arranged to face the platen 42. The recording unit 24 includes a carriage 23 that is movable in the left-right direction 9 (an exemplary main scanning direction) along unillustrated guide rails and the recording head 39 mounted on the carriage 23. Applying driving force from a carriage motor 103 (see FIG. 4) to the carriage 23 moves the carriage 23 in the left-right direction 9.

As depicted in FIG. 2, the recording head 39 includes a nozzle surface 46 facing the platen 42. The nozzles 40 are formed on the nozzle surface 46. The carriage 23 supports the recording head 39 such that the nozzle surface 46 faces the platen 42. In the nozzle surface 46 of the recording head 39, the nozzles 40 form nozzle rows corresponding to four colors of inks including black, yellow, cyan, and magenta, respectively. The respective nozzle rows extend in the front-rear direction 8. The recording head 39 jets the four colors of inks supplied from the corresponding one of ink cartridges (not depicted) through each nozzle 40 during its movement in the left-right direction 9 together with the carriage 23.

Figure 4:
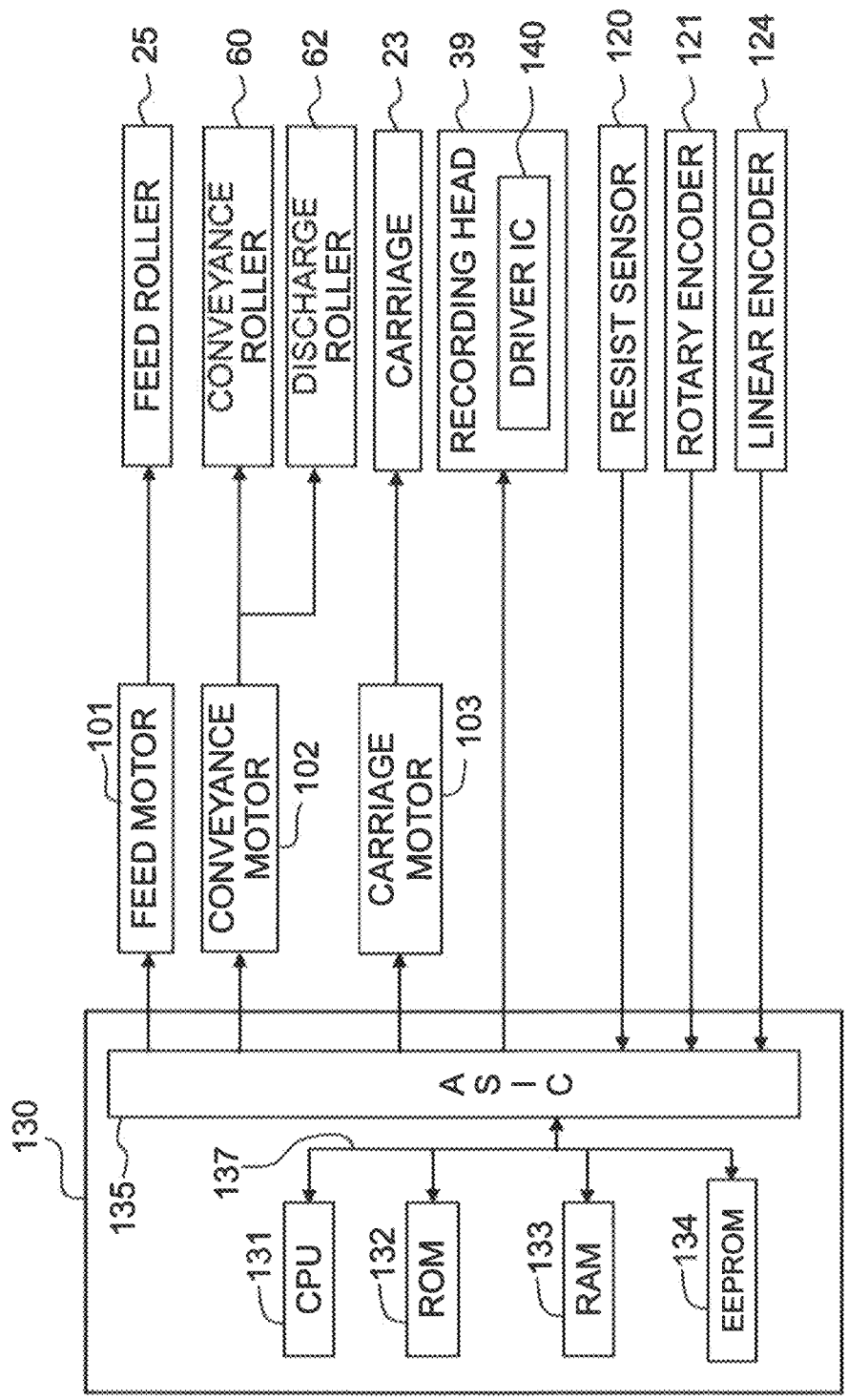
FIG. 4 is a block diagram of a controller of the multi-functional peripheral.

Although not illustrated in FIG. 2, the guide rail includes a linear encoder 124 (see FIG. 4). The linear encoder 124 includes an unillustrated encoder strip provided in the guide rail and an encoder sensor mounted on the carriage 23. The encoder strip is formed in a belt shape, and transmissive parts and non-transmissive parts are alternately arranged in a longitudinal direction of the guide rail at regular pitches. The carriage 23 is provided with the encoder sensor that is a transmission-type optical sensor. The encoder sensor detects a pattern of the encoder strip during reciprocating movement of the carriage 23 and outputs a pulse signal to the controller 130. The controller 130 calculates the moving direction and speed of the carriage 23 based on the pulse signal to perform constant-speed control and acceleration/deceleration control of the carriage 23 during its reciprocating movement.

Figure 3:
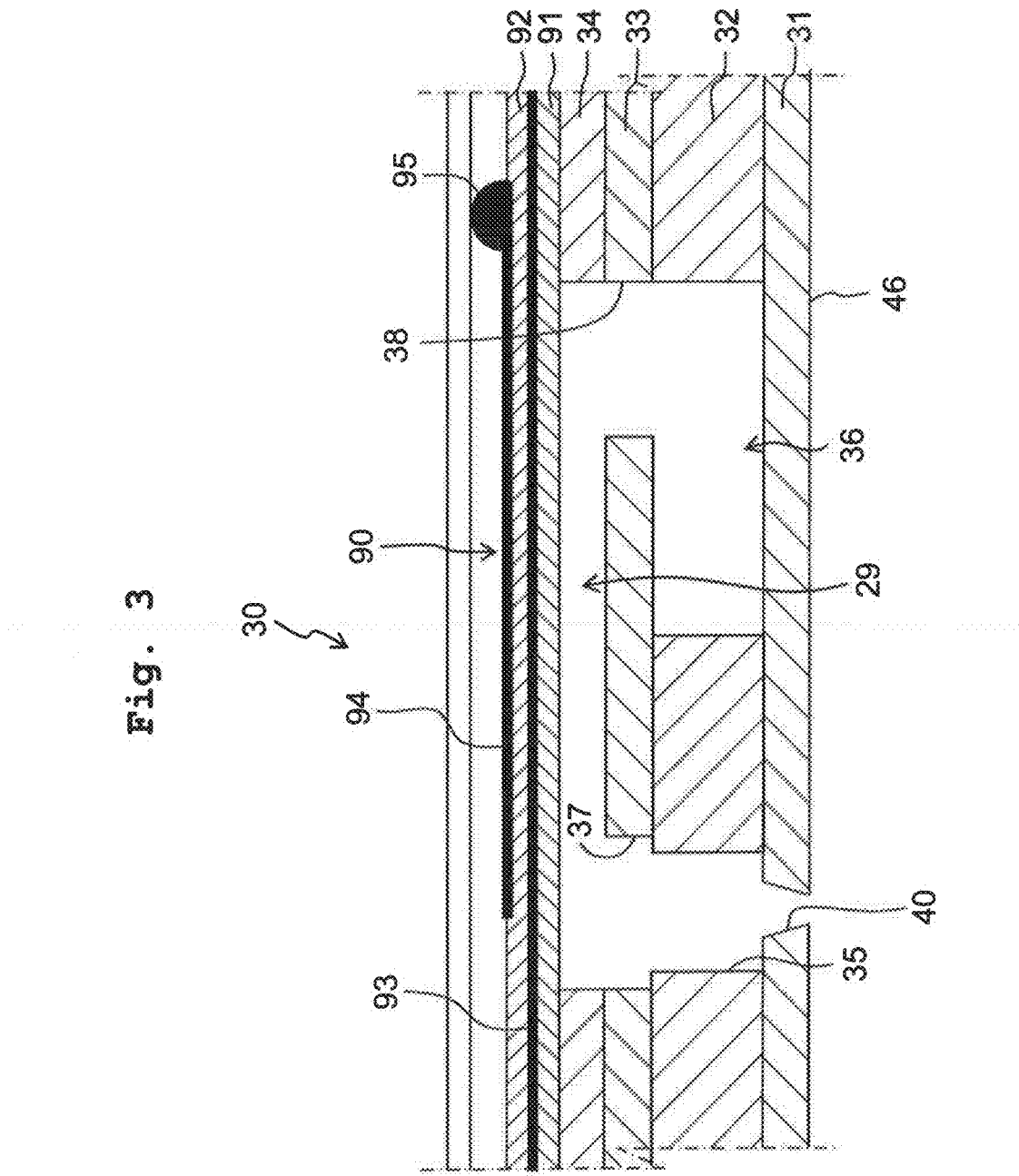
FIG. 3 is a cross-sectional view schematically depicting a configuration that includes a channel unit and a piezoelectric actuator of a recording head.

As depicted in FIG. 3, the recording head 39 includes a channel unit 30 and a piezoelectric actuator 90. The channel unit 30 is configured by four stacked plates 31 to 34, such as metal plates. The plate 31 has the nozzle surface 46 in which the nozzles 40 are defined by through holes. The plate 32 includes through holes 35 at positions overlapping with the nozzles 40. The plate 32 includes at least four manifold channels 36 at positions not overlapping with the nozzles 40.

The plate 33 includes through holes 37 at positions overlapping with the nozzles 40 and through holes 38 at positons overlapping with the manifold channels 36. The plate 34 includes pressure chambers 29. Each of the pressure chambers 29 overlaps with the corresponding one of thorough holes 37 and the corresponding one of thorough holes 38. Namely, one nozzle 40 communicates with one through hole 35, one through hole 37, one pressure chamber 29, and one through hole 38. Each of the manifold channels 36 communicates with the thorough holes 38. Although not illustrated in FIG. 3, each of the inks of four colors is supplied from the corresponding one of the ink cartridges to the corresponding one of the manifold channels 36. Ink channels are formed to extend from the manifold channels 36 to the nozzles 40 via the pressure chambers 29.

The piezoelectric actuator 90 includes a vibration plate 91, a piezoelectric layer 92, a common electrode 93, and individual electrodes 94. The vibration plate 91 is made from, for example, a piezoelectric material. The vibration plate 91 is disposed above the channel unit 30 to cover the pressure chambers 29. The piezoelectric layer 92, which is made from, for example, a piezoelectric material, is disposed on an upper surface of the vibration plate 31 to extend across the pressure chambers 29.

The common electrode 93 is disposed between the vibration plate 91 and the piezoelectric layer 92 to extend along them. The common electrode 93 is kept at a ground potential. The individual electrodes 94, which are provided corresponding to the pressure chambers 29 individually, are disposed on an upper surface of the piezoelectric layer 92. Any of the ground potential and a predefined driving potential is selectively applied to each individual electrode 94. A part, of the piezoelectric layer 92, sandwiched between each individual electrode 94 and the common electrode 93 is polarized in its thickness direction.

Each individual electrode 94 includes a bump terminal 95 at a portion not facing the pressure chamber 29. Each individual electrode 94 is electrically connected to a boosting buffer 147 of a driver IC 140 via the bump terminal 95. In the following description, a part of the piezoelectric actuator 90 corresponding to each pressure chamber 29 (and each nozzle 40 communicating with the corresponding pressure chamber 29) will be referred to as a driving element. Each driving element applies pressure to the ink in the corresponding pressure chamber 29 so as to jet the ink from the nozzle 40. For example, applying the driving potential to the individual electrode 94 of a predefined driving element causes the predefined driving element to swell toward the piezoelectric chamber 29. This keeps the pressure chamber 29 corresponding to the predefined driving element a first volume. Then, applying the ground potential to the individual electrode 94 of the predefined driving element eliminates the swelling of the predefined driving element toward the pressure chamber 29. This causes the pressure chamber 29 corresponding to the predefined driving element to swell so as to have a second volume larger than the first volume. In that configuration, the degree and time of deformation (swelling) of the driving element depend on the driving voltage to be applied to the driving element. Thus, the driving element causes the ink to be jetted from the corresponding nozzle 40 by an amount corresponding to the driving voltage to be applied from the driver IC 140.

<Controller 130>

As depicted in FIG. 4, the controller 130 includes a CPU 131, a ROM 132, a RAM 133, an EEPROM 134, an ASIC 135, and an internal bus 137 connecting the above components with each other. The ROM 132 stores, for example, programs for the CPU 131 to control various operations. The RAM 133 is used as a storage area temporarily recording data, signals, and the like to be used when the CPU 131 executes the above programs, or a working area for data processing. The EEPROM 134 stores settings, flags, and the like which should be retained even after the power is turned off.

The ASIC 135 is connected to the conveyance motor 101, the feed motor 102, and the carriage motor 103. The ASIC 135 obtains driving signals for rotating the motors 101, 102, and 103 from the CPU 131 and outputs driving currents corresponding to the driving signals to the motors 101, 102, and 103. The respective motors are driven by the driving currents outputted from the ASIC 135. For example, the controller 130 controls driving of the feed motor 101 to rotate the feed roller 25. The controller 130 controls driving of the conveyance motor 102 to rotate the conveyance roller 60. The controller 130 controls driving of the carriage motor 103 to reciprocatingly move the carriage 23. The controller 130 controls the recoding head 39 to jet ink from each nozzle 40.

The ASIC 135 is electrically connected to the resist sensor 120, rotary encoder 121, and linear encoder 124. The controller 130 detects a position of the sheet 12 based on a detection signal outputted from the resist sensor 120 and a pulse signal outputted from the rotary encoder 121. The controller 130 detects a position of the carriage 23 based on a pulse signal obtained from the linear encoder 124.

<Driver IC 140>

Figure 5:
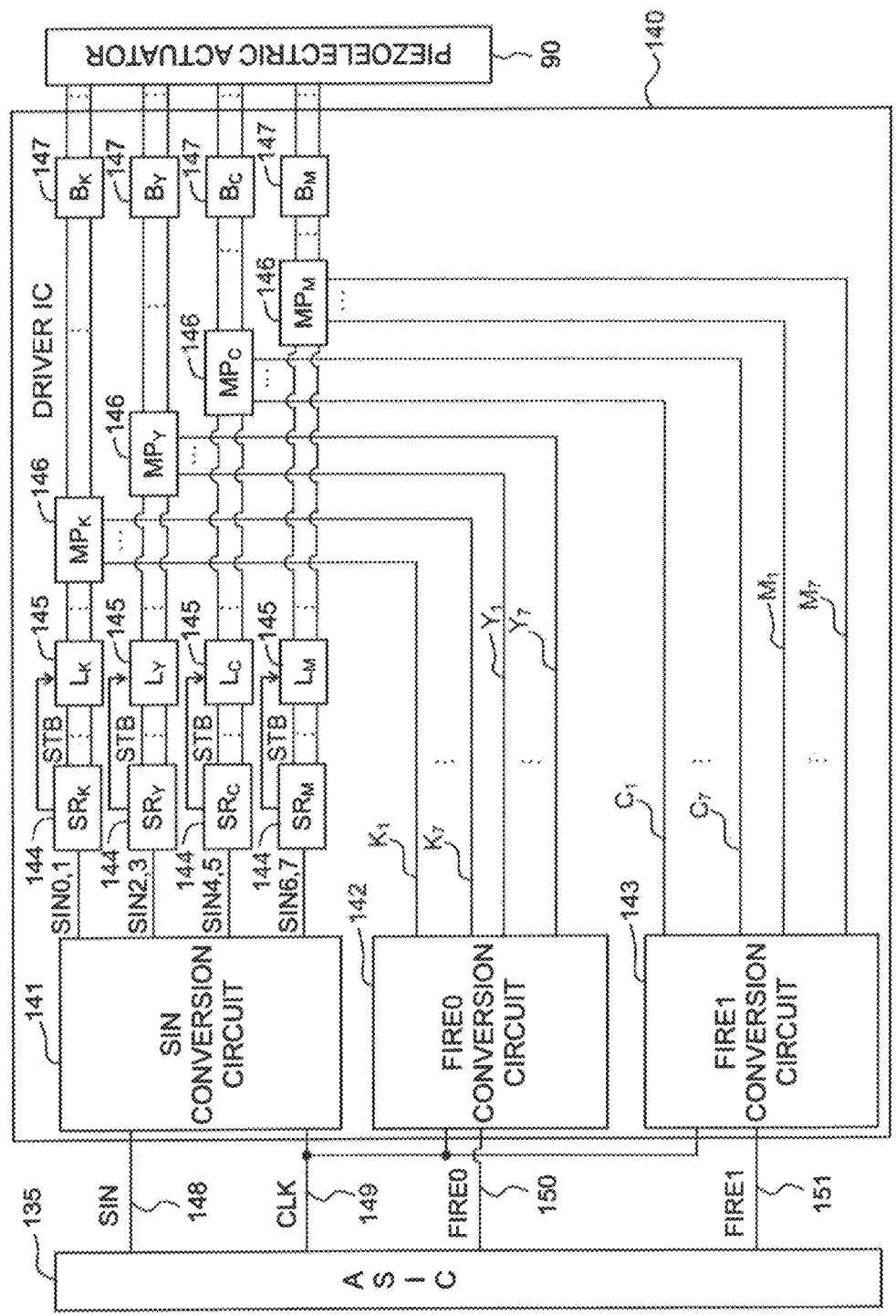
FIG. 5 is a block diagram depicting an ASIC, a driver IC, and the piezoelectric actuator.

The carriage 23 carries the driver IC 140 (an exemplary head driving circuit) together with the recording head 39. As depicted in FIG. 5, the driver IC 140 is electrically connected to the piezoelectric actuator 90 of the recording head 39. The driver IC 140 is electrically connected to the ASIC 135 of the controller 130 via a flexible flat cable. The flexible flat cable changes its posture following the reciprocating movement of the carriage 23. For example, high-frequency signals (SIN, CLK, FIRE0, FIRE1, and the like) in a Low Voltage Differential Signaling (LVDS) system are transmitted from the ASIC 135 to the driver IC 140 via the flexible flat cable (exemplary output processing). Further, the ground potential and a predefined driving potential are applied from the ASIC 135 to the driver IC 140. FIG. 5 depicts signal lines 148 to 151 that are conductive lines provided for the flexible flat cable. The signal line 148 is an exemplary second signal line. The signal line 149 is an exemplary third signal line. Each of the signal lines 150 and 151 is an exemplary first signal line.

The driver IC 140 includes a SIN conversion circuit 141, a FIRE0 conversion circuit 142, a FIRE1 conversion circuit 143, shift resistors 144 ($SR_K$, $SR_Y$, $SR_C$, $SR_M$), latch circuits 145 ($L_K$, $L_Y$, $L_C$, $L_M$), multiplexers 146 ($MP_K$, $MP_Y$, $MP_C$, $MP_M$), and boosting buffers 147 ($B_K$, $B_Y$, $B_C$, $B_M$).

A jetting instruction signal SIN, reset signal, and clock signal CLK are inputted to the SIN conversion circuit 141. The jetting instruction signal SIN includes a control signal for the piezoelectric actuator 90 and a strobe signal STB for each latch circuit 145. The jetting instruction signal SIN is a serial signal generated by the ASIC 135. The SIN conversion circuit 141 generates four selection signals SIN0, 1, SIN2, 3, SIN4, 5, and SIN6, 7 from the jetting instruction signal SIN and outputs them in parallel to the respective shift resistors 144. The selection signal SIN0, 1 is a control signal for the driving elements corresponding to the nozzles 40 from which black ink is jetted. The selection signal SIN2, 3 is a control signal for the driving elements corresponding to nozzles 40 from which yellow ink is jetted. The selection signal SIN4, 5 is a control signal for the driving elements corresponding to the nozzles 40 from which cyan ink is jetted. The selection signal SIN6, 7 is a control signal for the driving elements corresponding to the nozzles 40 from which magenta ink is jetted.

The pattern signal FIRE0 and the clock signal CLK are inputted to the FIRE0 conversion circuit 142. The pattern signal FIRE0 is a serial signal generated by the ASIC 135. The pattern signal FIRE0 includes signals indicating seven driving waveforms $Kf_1$ to $Kf_7$ for the driving elements corresponding to the nozzles 40 from which black ink is jetted and signals indicating seven driving waveforms $Yf_1$ to $Yf_7$ for the driving elements corresponding to the nozzles 40 from which yellow ink is jetted. The FIRE0 conversion circuit 142 converts the serial signal into a parallel signal with each of a range starting from a rising edge to a falling edge of the clock signal CLK and a range starting from a falling edge to a rising edge of the clock signal CLK as a section, thereby generating the driving waveforms $Kf_1$ to $Kf_7$ and driving waveforms $Yf_1$ to $Yf_7$. Then, the FIRE0 conversion circuit 142 outputs them in parallel to the respective multiplexers 146 (exemplary first extraction processing).

The pattern signal FIRE1 and the clock signal CLK are inputted to the FIRE1 conversion circuit 143. The pattern signal FIRE1 is a serial signal generated by the ASIC 135. The pattern signal FIRE1 includes seven driving waveforms $Cf_1$ to $Cf_7$ for the driving elements corresponding to the nozzles 40 from which cyan ink is jetted and seven driving waveforms $Mf_1$ to $Mf_7$ for the driving elements corresponding to the nozzles 40 from which magenta ink is jetted. The FIRE1 conversion circuit 142 converts the serial signal into a parallel signal within each of a range starting from a rising edge to a falling edge of the clock signal CLK and a range starting from a falling edge to a rising edge of the clock signal CLK as a section, thereby generating the driving waveforms $Cf_1$ to $Cf_7$ and driving waveforms $Mf_1$ to $Mf_7$. Then, the FIRE1 conversion circuit 143 outputs them in parallel to the respective multiplexers 146.

The four selection signals SIN0, 1, SIN2, 3, SIN4, 5, and SIN6, 7 and the strobe signals STB are inputted from the SIN conversion circuit 141 to the respective shift resistors 144. The clock signal CLK is inputted to the respective shift resistors 144. Each of the shift resistors 144 converts the inputted selection signal (any one of the SIN0, 1, SIN2, 3, SIN4, 5, and SIN6, 7) into signals corresponding to the respective nozzles 40 in synchronization with the clock signal CLK, and then outputs those signals in parallel to the corresponding one of the latch circuits 145. Each of the latch circuits 145 outputs the signals inputted from the corresponding one of the shift resistors 144, in parallel, to the corresponding one of the multiplexers 146, as control signals corresponding to the respective nozzles 40, at a timing at which the strobe signal STB is inputted.

Each of the multiplexers 146 selects the driving waveform for each nozzle 40 (any one of the driving waveforms $Kf_1$ to $Kf_7$, $Yf_1$ to $Yf_7$, $Cf_1$ to $Cf_7$, and $Mf_1$ to $Mf_7$ inputted from the FIRE0 conversion circuit 142 or the FIRE1 conversion circuit 143) in response to the control signals inputted from the corresponding one of the latch circuits 145. Then, each of the multiplexers 146 inputs the selected driving waveform to the corresponding one of the boosting buffers 147, as the driving waveform for the corresponding driving element. Each of the boosting buffers 147 boosts the driving waveform to the driving potential to generate the driving signal for driving the corresponding driving element, and then outputs the driving signal to the individual electrode 94 of the corresponding driving element. This switches the potential of each individual electrode 94 between the ground potential and the driving potential, thus driving each driving element.

<Jetting Instruction Signal SIN>

As depicted in FIG. 6, the jetting instruction signal SIN includes a first signal area in which the selection signal SIN0, 1 corresponding to the nozzles 40 from which black ink is jetted is set, a second signal area in which the selection signal SIN2, 3 corresponding to the nozzles 40 from which yellow ink is jetted is set, a third signal area in which the selection signal SIN4, 5 corresponding to the nozzles 40 from which cyan ink is jetted is set, and a fourth signal area in which the selection signal SIN6, 7 corresponding to the nozzles 40 from which magenta ink is jetted is set, in that order repeatedly. The selection signal corresponding to each nozzle 40 has a signal length that is 1/N (N is a natural number) of each signal area. In this embodiment, the selection signal corresponding to each nozzle 40 has a signal length of three bits corresponding to 1/2 (N=2) of each signal area.

The jetting instruction signal SIN includes the strobe signals STB corresponding to the nozzle rows for black ink, nozzle rows for yellow ink, nozzle rows for cyan ink, and nozzle rows for magenta ink, respectively. Each of the strobe signals STB has a signal length that is M times each signal area. The strobe signals STB are set to be distributed in signal areas. In this embodiment, each of the strobe signals STB has a signal length of 13-bits that is 13/6 times (M=13/6) of each signal area.

As indicated in FIG. 7, the jetting instruction signal SIN includes a voltage instruction signal HL indicating that a standby voltage of the driving elements is set to the driving potential or ground potential. In this embodiment, the voltage instruction signal HL is a 1-bit signal. For example, in FIG. 7, the voltage instruction signal HL is included in a row "H" of a column "SIN0". The voltage instruction signal HL indicates that the standby voltage is set to the driving potential when the voltage instruction signal HL is in a state of High (HL=1, an exemplary third value). The voltage instruction signal HL indicates that the standby potential is set to the ground potential when the voltage instruction signal HL is in a state of Low (HL=0, an exemplary fourth value).

In the ASIC 135, the jetting instruction signal SIN is generated as a signal including the selection signals SIN0 to SIN7, the strobe signals STB, and the voltage instruction signals HL, and the jetting instruction signal SIN is transmitted serially to the SIN conversion circuit 141 through the signal line 148. In the recording processing, when the four nozzle rows have mutually different amounts of flying time of inks jetted from the nozzles 40, the ASIC 135 may appropriately make each of the selection signals SIN0 to SIN7 the Low signal, as depicted in FIG. 7. The jetting instruction signal SIN may include another control signal RSV that is transmitted to the driver IC 140.

As indicated in FIG. 7, each of the shift resistors 144 extracts the selection signals SIN0 to SIN7, the strobe signals STB, and the voltage instruction signal HL in synchronization with the clock signal CLK. This processing is exemplary second extraction processing. In that processing, the selection signal (any of the SIN0 to SIN7) corresponding to each nozzle 40 (each driving element) is extracted. Further, 13-consecutive-bit High signals are extracted as one strobe signal STB.

<Pattern Signal FIRE0>

As depicted in FIG. 6, the pattern signal FIRE0 is a signal configured by signals that indicate the seven driving waveforms $Kf_1$ to $Kf_7$ for the driving elements corresponding to the nozzle rows for black ink and signals that indicate the seven driving waveforms $Yf_1$ to $Yf_7$ for the driving elements corresponding to the nozzle rows for yellow ink, wherein the signals indicating the waveforms $Kf_1$ to $Kf_7$ and the signals indicating the waveforms $Yf_1$ to $Yf_7$ are arranged alternatingly and serially. Each of the driving waveforms $Kf_1$ to $Kf_7$ and $Yf_1$ to $Yf_7$ is, for example, a pulse signal indicating a timing and time at which the ground potential is applied to the individual electrode 94 having the standby voltage kept at the driving potential. The driving waveforms $Kf_1$ to $Kf_7$ generated by the FIRE0 conversion circuit 142 are outputted in parallel to the multiplexer 146 ($MP_K$). The multiplexer 146 ($MP_K$) selects, based on the selection signal SIN0, 1, any of the driving waveforms $Kf_1$ to $Kf_7$ for each nozzle 40 for black ink, and inputs it to the boosting buffer 147 ($B_K$). The boosting buffer 147 ($B_K$) boosts the inputted driving waveform to the driving potential to generate the driving signal, and outputs the driving signal to the individual electrode 94 of the corresponding driving element. The driving waveforms $Yf_1$ to $Yf_7$ generated by the FIRE0 conversion circuit 142 are outputted in parallel to the multiplexer 146 ($MP_Y$). The multiplexer 146 ($MP_Y$) selects, based on the selection signal SIN2, 3, any of the driving waveforms $Yf_1$ to $Yf_7$ for each nozzle 40 for yellow ink, and inputs it to the boosting buffer 147 ($B_Y$). The boosting buffer 147 ($B_Y$) boosts the inputted driving waveform to the driving potential to generate the driving signal, and outputs the driving signal to the individual electrode 94 of the corresponding driving element. Those pieces of processing are examples of voltage application processing.

<Pattern Signal FIRE1>

As depicted in FIG. 6, the pattern signal FIRE1 is a signal configured by signals that indicate the seven driving waveforms $Cf_1$ to $Cf_7$ for the driving elements corresponding to the nozzle rows for cyan ink and signals that indicate the seven driving waveforms $Mf_1$ to $Mf_7$ for the driving elements corresponding to the nozzle rows for magenta ink, wherein the signals indicating the waveforms $Cf_1$ to $Cf_7$ and the signals indicating the waveforms $Mf_1$ to $Mf_7$ are arranged alternatingly and serially. Each of the driving waveforms $Cf_1$ to $Cf_7$ and $Mf_1$ to $Mf_7$ is, for example, a pulse signal indicating a timing and time at which the ground potential is applied to the individual electrode 94 having the standby voltage kept at the driving potential. The driving waveforms $Cf_1$ to $Cf_7$ generated by the FIRE1 conversion circuit 143 are outputted in parallel to the multiplexer 146 ($MP_C$). The multiplexer 146 ($MP_C$) selects, based on the selection signal SIN4, 5, any of the driving waveforms $Cf_1$ to $Cf_7$ for each nozzle 40 for cyan ink, and inputs it to the boosting buffer 147 ($B_C$). The boosting buffer 147 ($B_C$) boosts the inputted driving waveform to the driving potential to generate the driving signal, and outputs the driving signal to the individual electrode 94 of the corresponding driving element. The driving waveforms $Mf_1$ to $Mf_7$ generated by the FIRE1 conversion circuit 143 are outputted in parallel to the multiplexer 146 ($MP_M$). The multiplexer 146 ($MP_M$) selects, based on the selection signal SIN6, 7, any of the driving waveforms $Mf_1$ to $Mf_7$ for each nozzle 40 for magenta ink, and inputs it to the boosting buffer 147 ($B_M$). The boosting buffer 147 ($B_M$) boosts the inputted driving waveform to the driving potential to generate the driving signal, and outputs the driving signal to the individual electrode 94 of the corresponding driving element. Those pieces of processing are examples of the voltage application processing as well.

The following explanation will be made on definition of driving waveforms by citing the signals indicating the seven driving waveforms $Kf_1$ to $Kf_7$ of the pattern signal FIRE 0. Except the difference in ink colors, other remaining driving waveforms $Yf_1$ to $Yf_7$, $Cf_1$ to $Cf_7$, and $Mf_1$ to $Mf_7$ are defined similarly to the driving waveforms $Kf_1$ to $Kf_7$. Thus, the following explanation will be made by omitting alphabetic suffixes of K, Y, C, and M that indicate respective ink colors, that is, by only using the numerals 1 to 7 assigned together with those suffixes.

As depicted in FIG. 9, the signals indicating the seven driving waveforms are assigned to the pattern signal FIRE. As depicted in FIG. 6A, an empty signal area is assigned to the pattern signal FIRE. The empty signal area is provided for convenience, for the purpose of, for example, easily performing the synchronization with the clock signal CLK and making the length of the jetting instruction signal SIN outputted serially and the length of the pattern signals FIRE0 and FIRE1 uniform when eight signal areas of the selection signals SIN0 to SIN7 form a group, as in this embodiment. That is, the empty signal area is not indispensable.

The pattern signal indicated by "1" (an exemplary first pattern signal) corresponds to a smallest ink jetting amount "S" (an exemplary first amount) from the nozzle 40. The smallest ink jetting amount is a concept including zero. The pattern signal indicated by "2" (an exemplary third pattern signal) corresponds to an ink jetting amount "M" (an exemplary third amount) that is larger than "S". The pattern signal indicated by "3" (an exemplary second pattern signal) corresponds to an ink jetting amount "L" (an exemplary second amount) that is larger than "M". The pattern signal indicated by "4" (an exemplary fourth pattern signal) corresponds to a largest ink jetting amount "LL" (an exemplary fourth amount) from the nozzle 40.

The pattern signals indicated by "5" and "6", which are indicated by "long", are used when the ink jetting amount from the nozzle 40 is different from ink jetting amounts provided through the previous jetting and the following jetting. When the same amount of ink is jetted continuously from the nozzle 40, the ink may be jetted before and after the continuous ink jetting or no ink may be jetted before and after the continuous ink jetting. In those situations, even when the same driving potential is applied to the driving element, different amounts of ink may be jetted from the nozzle 40 during the continuous ink jetting. In order to solve that problem, that is, in order to jet the same amount of ink from the nozzle 40 during the continuous ink jetting, the pattern signals indicated by "5" and "6" are used. For example, when the ink amount "LL" is continuously jetted from one nozzle 40 and no ink is jetted before and after the continuous ink jetting, the pattern signals indicated by "5" and "6" are used. Those signals are not indispensable.

The pattern signal indicated by "7" (an exemplary non-jetting driving pattern signal) corresponds to non-jetting driving in which no ink is jetted from the nozzle 40 but ink vibrates in the nozzle 40. For example, ink may be jetted from some nozzles 40 of the recording head 39 during movement of the carriage 23, but no ink may be jetted from other remaining nozzles 40. Specifically, when a pass is executed to record only a monochrome character or image, only the black ink is jetted from the nozzles 40 for black ink and other remaining inks are not jetted from nozzles 40 for other inks in that pass. In that case, the nozzles 40 for other remaining inks from which no inks are jetted are required to be prevented from having dry and solidification of ink, and the like. Thus, the non-jetting driving is selected by the selection signals SIN2 to SIN7 to apply the potential of the non-jetting driving to the driving elements for the nozzles 40 from which other remaining inks are jetted.

As depicted in FIG. 6A, the pattern signals 1 to 7 indicating the seven driving waveforms respectively are synchronized with the clock signal CLK in order of "5, 1, 3, 7, 4, 2, 6, -", and then they are continuously outputted serially from the ASCI 135. The pattern signal 1 is adjacent to the forward side of the pattern signal 3. The pattern signal 7 is adjacent to the backward side of the pattern signal 3. The pattern signal 4 is adjacent to the backward side of pattern signal 7. The pattern signal 2 is adjacent to the backward side of the pattern signal 4.

The pattern signals 1 and 7 are synchronized with one of the rising edge and falling edge of the clock signal CLK (falling edge in FIG. 6A), and the pattern signal 4 is synchronized with the other of the rising edge and falling edge of the clock signal CLK (rising edge in FIG. 6A).

<Image Recording Processing>

Referring to FIG. 10, the image recording processing of the multifunction peripheral 10 will be explained. The image recording processing is performed by the CPU 131 of the controller 130. The following processing may be performed by the CPU 131 reading each program stored in the ROM 132 or a hardware circuit mounted on the controller 130.

The controller 130 executes the image recording processing indicated in FIG. 10 upon obtaining an image recording instruction from a user. Although the way to obtain the image recording instruction is not particularly limited, the image recording instruction may be obtained through an operation panel provided in the multifunction peripheral 10 or obtained from an external device via a communication network. The controller 130 controls each roller, the carriage 23, and the recording head 39 based on the image recording instruction to perform image recording on the sheet 12. The image recording instruction may include, for example, image data to be recorded on the sheet 12, sheet type information relating to the type of the sheet 12 for which the image is to be recorded (e.g., information specifying whether the sheet 12 is regular sheet or gloss sheet), and fiber information relating to a fiber direction of the sheet 12 (i.e., information specifying whether the paper grain of the sheet 12 is perpendicular or horizontal to the long side of the sheet).

<Feeding and Cueing of Sheet>

At first, the controller 130 performs feeding and cueing of the sheet 12 (S11) in which the sheet 12 supported by the feed tray 20 is fed to a recording start position. Specifically, the controller 130 controls the feed motor 101 to rotate the feed roller 25, thereby feeding the sheet 12 on the feed tray 20 to the conveyance route 65. When the front end (downstream end in the conveyance direction 16) of the sheet 12 has arrived at the conveyance roller unit 54, the controller 130 controls the conveyance motor 102 to rotate the conveyance roller 60, thereby executing cueing of the sheet 12 (positioning of the front end of the sheet 12 at the recording start position). The recording start position is a position where an area of the sheet 12, for which an image is recorded first, faces the nozzle surface 46 of the recording head 39. The controller 130 recognizes the arrival of the sheet 12 at the conveyance roller unit 54 and the recording start position, based on the combination of the detection signal from the resist sensor 120 and the pulse signal from the rotary encoder 121.

<Recording Processing>

Subsequently, the controller 130 performs recording processing (S12). In the recording processing, the controller 130 controls the recording head 39 to jet the ink at a predefined jetting timing while controlling the carriage motor 103 to move the carriage 23 in the left-right direction 9. Specifically, each ink droplet is selectively jetted from each nozzle 40 of the recording head 39 moving in the left-right direction 9 on the sheet 12 of which conveyance is being stopped. Accordingly, image recording corresponding to one pass is performed on the sheet 12.

Next, when the image recording corresponding to one pass performed most recently is not the image recording corresponding to the last pass (S13: No), the controller 130 performs conveyance processing in which the sheet 12 is conveyed in the conveyance direction 16 by a predefined line feed width (S14). Specifically, the controller 130 rotates the conveyance motor 102 by a predefined number of rotations, thus conveying the sheet 12 with at least one of the conveyance roller unit 54 and the discharge roller unit 55 by the predefined line feed width. As a result, the area of the sheet 12 for which image recording is to be performed in the next pass faces the recording head 39.

The controller 130 repeatedly performs the processing from the step S12 to the step S14 until the image recording corresponding to one pass for the sheet 12 is the last pass (S13: Yes). When the image recording corresponding to the last pass for the sheet 12 has been completed (S13: Yes), the controller 130 performs discharge processing in which the sheet 12 is discharged on the discharge tray 21 (S15). Specifically, the controller 130 rotates the conveyance motor 102 by a predefined number of rotations, thereby discharging the sheet 12 with the discharge roller unit 55.

When the printing data includes data for the next page (S16: Yes), the controller 130 performs image recording for the next page by performing the recording preparation processing (S11) as described above and then performing the recording processing (S12) and the conveyance processing (S14) repeatedly. When the printing data includes no data for the next page (S16: No), the controller 130 ends the image recording.

<Function and Effect of Embodiment>

When radiation noise or the like occurs in the flexible flat cable connecting the controller 130 and the driver IC 140, for example, as depicted in FIG. 8A, the rising edge and falling edge of an unnecessary pulse rise may be caused in the clock signal CLK. Or, as depicted in FIG. 8B, the pulse of the clock signal CLK may partially disappear. As a result, for example, in the pattern signal FIRE0 extracted in synchronization with the clock signal CLK in the FIRE0 conversion circuit, the same driving waveform may continue and/or a necessary driving waveform may disappear. Those cause the multiplexer 146 to select a driving waveform that is different from the driving waveform supposed to be selected by the selection signals SIN0, 1 and SIN2, 3 and to output it to the boosting buffer 147. As a result, the driving elements supposed to be driven based on the printing data may not be driven, which may make an image to be recorded on the sheet 12 imperfect.

A case, in which the pattern signals FIRE0 and FIRE1 are extracted with the rising edge and falling edge of the clock signal CLK determined as starting points, will be explained. For example, as depicted in FIG. 8A, when noise increases the cycle or period of the clock signal CLK by one, the driver IC 140 erroneously recognizes and extracts the pattern signal 1 as the pattern signal 7; the pattern signal 1 is arranged before the pattern signal 7 indicating the non-jetting driving by two therefrom. Or, as depicted in FIG. 8B, when noise decreases the cycle or period of the clock signal CLK by one, the driver IC 140 erroneously recognizes and extracts the pattern signal 2 as the pattern signal 7; the pattern signal 2 is arranged after the pattern signal 7 indicating the non-jetting driving by two therefrom. In the pattern signals FIRE0 and FIRE1 of this embodiment, the ink amount (S) jetted by the pattern signal that is arranged before the pattern signal 7 indicating the non-jetting driving by two therefrom is smaller than the ink amount (L) jetted by the pattern signal that is arranged before the pattern signal 7 by one therefrom. Further, the ink amount (M) jetted by the pattern signal that is arranged after the pattern signal 7 indicating the non-jetting driving by two therefrom is smaller than the ink amount (LL) jetted by the pattern signal that is arranged after the pattern signal 7 by one therefrom. Accordingly, it is possible to reduce the ink amount which may otherwise be jetted erroneously due to the superimposition of noise on the clock signal CLK.

According to statistics, noise is most likely to increase the cycle or period of the clock signal CLK by one. Thus, like this embodiment, the ink amount jetted by the pattern signal that is arranged before the pattern signal 7 by two therefrom is preferably the smallest ink jetting amount "S". Further, the pattern signal 2 indicating a second smallest ink jetting amount "M" is arranged after the pattern signal 7 by two therefrom. Thus, for example, even when noise decreases the cycle or period of the clock signal CLK by one, it is possible to reduce the ink amount which may otherwise be jetted erroneously.

When the signals are extracted with the rising edge and falling edge of the clock signal CLK determined as starting points, as in this embodiment, the driver IC 140 does not erroneously recognize the pattern signal extracted with the rising edge as the starting point and the pattern signal extracted with the falling edge as the starting point. In this embodiment, the pattern signal 7 indicating the non-jetting driving, the pattern signal 4 indicating the largest ink jetting amount "LL", and the pattern signal 3 indicating a second largest ink jetting amount "L" are outputted in synchronization with mutually different edges. Thus, it is possible to reduce the ink amount which may otherwise be jetted erroneously.

Modified Embodiments

Although the pattern signals FIRE0 and FIRE 1 are extracted with the rising edge and falling edge of the clock signal CLK determined as starting points in the above embodiment, the present teaching is not limited thereto. The pattern signals may be extracted with a range starting from a switching edge that is one of the rising edge and falling edge of the clock signal CLK to the next switching edge as a section. In that case, the selection signals SIN0 to SIN7 are also extracted within a range starting from the above switching edge of the clock signal CLK to the next switching edge.

In the extraction processing described above, as depicted in FIGS. 11A and 11B, the pattern signals 1 to 7 indicating the seven driving waveforms respectively are synchronized with the clock signal CLK in order of "5, 3, 1, 7, 2, 4, 6,-" and they are outputted serially from the ASIC 135. The pattern signal 3 is arranged before the pattern signal 1 by one therefrom, and the pattern signal 7 is arranged after the pattern signal 1 by one therefrom. The pattern signal 2 is arranged after the pattern signal 7 by one therefrom.

For example, when noise increases the cycle or period of the clock signal CLK by one, the driver 140 erroneously recognizes and extracts the pattern signal 1 as the pattern signal 7; the pattern signal 1 is arranged before the pattern signal 7 indicating the non-jetting driving by one therefrom. When noise decreases the cycle or period of the clock signal CLK by one, the driver 140 erroneously recognizes and extracts the pattern signal 2 as the pattern signal 7; the pattern signal 2 is arranged after the pattern signal 7 indicating the non-jetting driving by one therefrom. In this modified embodiment, the pattern signals 1, 2 corresponding to a small ink jetting amount are arranged at positions close to the pattern signal 7 indicating the non-jetting driving and the pattern signals 3, 4 corresponding to a large ink jetting amount are arranged at positions away from the pattern signal 7. Accordingly, it is possible to reduce the ink amount which may otherwise be jetted erroneously.

In the above embodiment and modified embodiments, each of the pattern signals FIRE0 and FIRE 1 includes the pattern signals 1 to 7 indicating the seven driving waveforms. The present teaching, however, is not limited thereto. Each of the pattern signals FIRE0 and FIRE1 may include at least a pattern signal (corresponding to the pattern signal 7) indicating the non-jetting driving and two pattern signals of which ink-jetting amounts are different from each other. Thus, the combination of the pattern signals may be, for example, "1, 2, 7", "1, 3, 7", "1, 4, 7", "2, 3, 7", "2, 4, 7", or "3, 4, 7". One or more pattern signals may be added to each of those pieces of combination.

The order of the pattern signals is determined to have a relationship therebetween in a group serially outputted as the pattern signals FIRE0 and FIRE 1. The present teaching, however, is not limited thereto. The order of the pattern signals may be determined to have a relationship with pattern signals included in the next group. For example, the order of the three pattern signals "1, 2, 7" described above may be "1, 2, 7" or "2, 7, 1".

The pattern signal 7 indicating the non-jetting driving may be synchronized with one of the rising edge and the falling edge of the clock signal CLK, and the pattern signal 4 indicating the largest ink jetting amount "LL" may be synchronized with the other of the rising edge and the falling edge of the clock signal CLK. The pattern signal 1 indicating the smallest ink jetting amount "S" and the pattern signal 7 may be synchronized with one of the rising edge and the falling edge of the clock signal CLK.

In the above embodiment, each of the four color inks of CMYK is jetted as ink droplets from the corresponding row of the nozzles 40. The present teaching, however, may be performed in a configuration jetting a single ink. Or, more than five color inks, including light cyan ink and the like in addition to the colors of CYMK, may be jetted as ink droplets from more than five nozzle rows of the nozzles 40. The recording head 39 is not limited to one moving together with the carriage 23. The multifunction peripheral 10 may include, for example, a recording head that is long in a width direction of the sheet 12. Or, for example, it is allowable to adopt a configuration in which a fixed stage supporting the sheet 12 is provided to perform image recording with the recording head 39 moving above the stage in all directions (longitudinal and lateral directions). Namely, the present teaching may adopt any configuration in which image recording is performed while the sheet 12 and the recording head 39 are relatively movable.

In the above embodiment, each driving element provided in the recording head 39 causes the ink to be jetted from the corresponding nozzle 40 by an amount corresponding to the driving voltage applied from the driver IC 140. The present teaching, however, is not limited thereto. Each driving element may be configured to jet ink droplets from the nozzle 40 by use of bubbles generated in the ink through heating of ink. When using such driving elements, the ink jetting amount from each nozzle 40 depends on the number of ink droplets. For example, when the ink amount is "S", one ink droplet is jetted. When the ink amount is "L", three ink droplets are jetted. Thus, the number of times of application of the driving voltage to each driving element may depend on the ink jetting amount from the nozzle 40.

What is claimed is:

1. An ink-jet recording apparatus, comprising:
   a recording head including nozzles and driving elements corresponding to the nozzles respectively;
   a controller; and
   a head driving circuit connected to the controller by a first signal line, a second signal line, and a third signal line through which a clock signal including edges is transmitted, the head driving circuit connected electrically to the driving elements,
   wherein each of the driving elements is configured to be driven to jet ink from one of the nozzles corresponding thereto by an amount corresponding to driving voltage applied from the head driving circuit,
   the controller is configured to repeatedly execute output processing, in which pattern signals indicating patterns of the driving voltage are continuously outputted to the first signal line while being synchronized with the clock signal, and in which selection signals are continuously outputted to the second signal line while being synchronized with the clock signal,
   each of the selection signals is used to select, from among the pattern signals, the driving voltage to be applied to the driving element corresponding thereto,
   the head driving circuit is configured to repeatedly execute first extraction processing, second extraction processing, and voltage application processing,
      the first extraction processing being processing in which the pattern signals inputted through the first signal line are extracted based on the respective edges of the clock signal,
      the second extraction processing being processing in which the selection signals inputted through the second signal line are extracted based on the respective edges of the clock signal,
      the voltage application processing being processing in which the driving voltage selected based on the selection signals is applied in parallel to the driving elements corresponding thereto,
   the pattern signals include:
      a non-jetting driving pattern signal indicating a pattern of the driving voltage by which no ink is jetted;
      a first pattern signal indicating a pattern of the driving voltage by which ink having a first amount is jetted; and
      a second pattern signal indicating a pattern of the driving voltage by which ink having a second amount larger than the first amount is jetted, and
   in the output processing, the controller is configured to output the pattern signals to the first signal line in an order in which the first pattern signal and the non-jetting driving pattern signal are adjacent to the second pattern signal.

2. The ink-jet recording apparatus according to claim 1, wherein, in the output processing, the controller is configured to output the pattern signals to the first signal line such that the first pattern signal, the second pattern signal, and the non-jetting driving pattern signal are arranged in that order.

3. The ink-jet recording apparatus according to claim 2, wherein the first amount is the smallest ink amount of ink amounts jetted based on the pattern signals except for the non-jetting driving pattern signal.

4. The ink-jet recording apparatus according to claim 3, wherein the pattern signals further include:
   a third pattern signal indicating a pattern of the driving voltage by which ink having a third amount is jetted and
   a fourth pattern signal indicating a pattern of the driving voltage by which ink having a fourth amount larger than the third amount is jetted,
   the third amount is larger than the first amount and smaller than the second amount, and
   in the output processing, the controller is configured to output the pattern signals to the first signal line such that the first pattern signal, the second pattern signal, the non-jetting driving pattern signal, the fourth pattern signal, and the third pattern signal are arranged in that order.

5. The ink-jet recording apparatus according to claim 4, wherein the fourth amount is larger than the second amount.

6. The ink-jet recording apparatus according to claim 1, wherein the edges of the clock signal include a rising edge and a falling edge,
   in the output processing, the controller is configured to synchronize the non-jetting driving pattern signal with one of the rising edge and the falling edge and to synchronize the second pattern signal with the other of the rising edge and the falling edge.

7. The ink-jet recording apparatus according to claim 1, further comprising a conveyor configured to convey a sheet,
   wherein the controller is configured to execute conveyance processing in which the sheet is conveyed with the conveyor to a position facing the recording head and the output processing in which an image is recorded on the sheet conveyed by the conveyance processing, and
   in the output processing, the controller is configured to set, in the selection signal for each of the nozzles from which no ink is jetted, a value to select the non-jetting driving pattern signal.

8. An ink-jet recording apparatus, comprising:
   a recording head including nozzles and driving elements corresponding to the nozzles respectively,
   a controller, and
   a head driving circuit connected to the controller by a first signal line, a second signal line, and a third signal line through which a clock signal including edges is transmitted, the head driving circuit connected electrically to the driving elements,
   wherein each of the driving elements is configured to be driven to jet ink from one of the nozzles corresponding thereto by an amount corresponding to driving voltage applied from the head driving circuit,
   the controller is configured to repeatedly execute output processing, in which pattern signals indicating patterns of the driving voltage are continuously outputted to the first signal line while being synchronized with the clock signal, and in which selection signals are continuously outputted to the second signal line while being synchronized with the clock signal,
   each of the selection signals is used to select, from among the pattern signals, the driving voltage to be applied to the driving element corresponding thereto,
   the head driving circuit is configured to repeatedly execute first extraction processing, second extraction processing, and voltage application processing,
   the first extraction processing being processing in which the pattern signals inputted through the first signal line are extracted based on the respective edges of the clock signal,
   the second extraction processing being processing in which the selection signals inputted through the second signal line are extracted based on the respective edges of the clock signal,
   the voltage application processing being processing in which the driving voltage selected based on the selection signals is applied in parallel to the driving elements corresponding thereto,
   the pattern signals include:
     a non-jetting driving pattern signal indicating a pattern of the driving voltage by which no ink is jetted;
     a first pattern signal indicating a pattern of the driving voltage by which ink having a first amount is jetted; and
     a second pattern signal indicating a pattern of the driving voltage by which ink having a second amount larger than the first amount is jetted,
   the edges of the clock signal include a rising edge and a falling edge, and
   in the output processing, the controller is configured to synchronize the non-jetting driving pattern signal and the first pattern signal with one of the rising edge and the falling edge of the clock signal and to synchronize the second pattern signal with the other of the rising edge and the falling edge of the clock signal.

9. An ink-jet recording apparatus, comprising:
   a recording head including nozzles and driving elements corresponding to the nozzles respectively,
   a controller, and
   a head driving circuit connected to the controller by a first signal line, a second signal line, and a third signal line through which a clock signal is transmitted, the head driving circuit connected electrically to the driving elements,
   wherein each of the driving elements is configured to be driven to jet ink from one of the nozzles corresponding thereto by an amount corresponding to driving voltage applied from the head driving circuit,
   the controller is configured to repeatedly execute output processing, in which pattern signals indicating patterns of the driving voltage are continuously outputted to the first signal line while being synchronized with the clock signal, and in which selection signals are continuously outputted to the second signal line while being synchronized with the clock signal,
   each of the selection signals is used to select, from among the pattern signals, the driving voltage to be applied to the driving element corresponding thereto,
   the clock signal includes rising edges and falling edges,
   the rising edges or the falling edges are switching edges,
   the head driving circuit is configured to repeatedly execute first extraction processing, second extraction processing, and voltage application processing,
   the first extraction processing being processing in which the pattern signals inputted through the first signal line are extracted based on the respective switching edges of the clock signal,
   the second extraction processing being processing in which the selection signals inputted through the second signal line are extracted based on the respective switching edges of the clock signal,
   the voltage application processing being processing in which the driving voltage selected based on the selection signals is applied in parallel to the driving elements corresponding thereto, the pattern signals include:
- a non-jetting driving pattern signal indicating a pattern of the driving voltage by which no ink is jetted;
- a first pattern signal indicating a pattern of the driving voltage by which ink having a first amount is jetted; and
- a second pattern signal indicating a pattern of the driving voltage by which ink having a second amount larger than the first amount is jetted, and in the output processing, the controller is configured to output the pattern signals to the first signal line in an order in which the second pattern signal and the non-jetting driving pattern signal are adjacent to the first pattern signal.

10. The ink-jet recording apparatus according to claim 9, wherein the pattern signals further include:
- a third pattern signal indicating a pattern of the driving voltage by which ink having a third amount is jetted; and
- a fourth pattern signal indicating a pattern of the driving voltage by which ink having a fourth amount larger than the third amount is jetted, the third amount is larger than the first amount and smaller than the second amount, and in the output processing, the controller is configured to output the pattern signals to the first signal line such that the second pattern signal, the first pattern signal, the non-jetting driving pattern signal, the third pattern signal, and the fourth pattern signal are arranged in that order.

* * * * *